(12) United States Patent
Zhang et al.

(10) Patent No.: US 11,490,281 B2
(45) Date of Patent: Nov. 1, 2022

(54) METHOD, TERMINAL DEVICE AND NETWORK DEVICE FOR CONFIGURING MEASUREMENT INTERVALS

(71) Applicant: Guangdong OPPO Mobile Telecommunications Corp., Ltd., Guangdong (CN)

(72) Inventors: Zhi Zhang, Dongguan (CN); Ning Yang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 7 days.

(21) Appl. No.: 16/752,176

(22) Filed: Jan. 24, 2020

(65) Prior Publication Data

US 2020/0162957 A1    May 21, 2020

Related U.S. Application Data

(63) Continuation of application No. PCT/CN2017/108200, filed on Oct. 28, 2017.

(51) Int. Cl.
*H04B 17/309* (2015.01)
*H04B 17/382* (2015.01)
(Continued)

(52) U.S. Cl.
CPC .......... *H04W 24/10* (2013.01); *H04B 17/309* (2015.01); *H04B 17/382* (2015.01);
(Continued)

(58) Field of Classification Search
CPC .......... H04B 17/0082–3913; H04W 8/22–245; H04W 24/02–10; H04W 36/005–385;
(Continued)

(56) References Cited

U.S. PATENT DOCUMENTS 8,526,322 B2    9/2013  Jung et al.
2015/0327103 A1  11/2015  Tang et al.
(Continued)

FOREIGN PATENT DOCUMENTS

CN    101466106 A    6/2009
CN    101616434 A    12/2009
(Continued)

OTHER PUBLICATIONS

3GPP TS 36.331 V14.0.0 RAN2, Stage 3 Technical Specification, issued on Sep. 2016, Section 5.5.2.9, 644 pages.
(Continued)

*Primary Examiner* — Timothy J Weidner
(74) *Attorney, Agent, or Firm* — Bayes PLLC

(57) ABSTRACT

Embodiments of this application disclose a measurement gap configuration method, a terminal device, and a network device. The method includes: receiving, by a terminal device, configuration information sent by a network device, where the configuration information includes at least one measurement gap corresponding to a plurality of radio frequency channels that the terminal device has; and performing, by the terminal device, signal quality measurement according to the at least one measurement gap. The measurement gap configuration method enables the terminal device to flexibly process a measurement and data receiving/transmission process, to reduce impact of measurement on data receiving/transmission, thereby improving user experience.

3 Claims, 3 Drawing Sheets

(51) Int. Cl.
| | |
|---|---|
| *H04W 8/24* | (2009.01) |
| *H04W 24/08* | (2009.01) |
| *H04W 24/10* | (2009.01) |
| *H04W 36/00* | (2009.01) |
| *H04W 72/04* | (2009.01) |
| *H04W 84/02* | (2009.01) |
| *H04W 88/06* | (2009.01) |
| *H04W 88/10* | (2009.01) |
| *H04W 92/02* | (2009.01) |
| *H04W 92/10* | (2009.01) |

(52) U.S. Cl.
CPC ............ *H04W 8/24* (2013.01); *H04W 8/245* (2013.01); *H04W 24/08* (2013.01); *H04W 36/0069* (2018.08); *H04W 36/0088* (2013.01); *H04W 72/042* (2013.01); *H04W 72/048* (2013.01); *H04W 72/0413* (2013.01); *H04W 72/0453* (2013.01); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC ... H04W 72/005–14; H04W 84/02–16; H04W 88/02; H04W 88/06; H04W 88/08; H04W 88/10; H04W 92/02; H04W 92/04; H04W 92/10

See application file for complete search history.

(56) References Cited

U.S. PATENT DOCUMENTS

| | | | |
|---|---|---|---|
| 2017/0019819 | A1 | 1/2017 | Yang et al. |
| 2018/0034598 | A1* | 2/2018 | Yiu ..................... H04W 24/10 |
| 2018/0076872 | A1* | 3/2018 | Li ......................... H04W 8/24 |

FOREIGN PATENT DOCUMENTS

| | | |
|---|---|---|
| CN | 101784075 A | 7/2010 |
| CN | 103428758 A | 12/2013 |
| CN | 106416350 A | 2/2017 |
| CN | 106535215 A | 3/2017 |
| EP | 2 624 628 A1 | 8/2013 |
| JP | 2017519391 A | 7/2017 |
| KR | 20160130286 A | 11/2016 |
| WO | 2011150842 A1 | 12/2011 |
| WO | 2016038763 A1 | 3/2016 |
| WO | 2016/080899 A1 | 5/2016 |
| WO | 2016171513 A1 | 10/2016 |

OTHER PUBLICATIONS

International Search Report, PCT/CN2017/108200, dated Jul. 2, 2018, 6 pages.
Supplementary European Search Report issued in corresponding European Application No. EP 17 92 9490, dated Oct. 15, 2020.
First Office action issued in corresponding Chinese Application No. 202010075262.X, dated Nov. 3, 2020, 27 pages.
"Draft: LS on gaps for SS block measurement in NR", Release 15, 3GPP RAN WG4 Meeting 84bis, R4-1711940, Dubrovnik, Croatia, Oct. 9-13, 2017, 3 pages.
The Second Office action issued in corresponding Chinese Application No. 202010075262.X. dated Feb. 23, 2021, 22 pages.
Decision of Rejection issued in corresponding Chinese Application No. 202010075262.X, dated May 20, 2021, 20 pages.
First Office action issued in corresponding India Application No. 202017022265, dated May 24, 2021, 7 pages.
First Office action issued in corresponding Japanese Application No. 2020-523756, dated Sep. 3, 2021, 8 pages.
First Office action issued in corresponding Korean Application No. 10-2020-7014514, dated Sep. 30, 2021, 13 pages.
"Further Discussion on Measurement Gap Design", Agenda item: 9.7.4.3, Source: MediaTek Inc , 3GPP TSG-RAN WG4 NR#84Bis, R4-1710671, Dubrovnik, Croatia, Oct. 9-13, 2017, 7 pages.
Notice of Reasons for Refusal issued in corresponding Japanese Application No. 2020-523756, dated Dec. 14, 2021, 10 pages.
Reexamination Notice issued in corresponding Chinese Application No. 202010075262.X, dated Jan. 29, 2022, 15 pages.
Notice of Allowance issued in corresponding Korean Application No. 10-2020-7014514, dated Apr. 8, 2022, 4 pages.
Decision of Reexamination issued in corresponding Chinese Application No. 202010075262.X, dated Mar. 28, 2022 24 pages.
"Further discussion on measurement gap for NR", Source: Intel Corporation, 3GPP TSG-RAN WG4 Meeting AH NR#3, R4-1709307, Nagoya, Japan, 18-21, Sep. 2017, 8 pages.

* cited by examiner

METHOD, TERMINAL DEVICE AND NETWORK DEVICE FOR CONFIGURING MEASUREMENT INTERVALS

CROSS-REFERENCES TO RELATED APPLICATIONS

This application is a continuation of and claims priority to International Patent Application PCT/CN2017/108200, filed on Oct. 28, 2017, the contents of which is hereby incorporated by reference in its entirety.

BACKGROUND OF THE INVENTION

Technical Field

Embodiments of the present invention relate to the communications field, and more specifically, to a measurement gap configuration method, a terminal device, and a network device.

Related Art

The 3GPP international standard organization began to develop 5th generation (5G) communications systems to meet societal demands for high-speed mobility and energy efficiency, in light of increasing diversification and complication of mobile digital services. Application scenarios of 5G include, but are not limited to enhanced mobile broadband (eMBB), ultra-reliable and low-latency communication (URLLC), and massive machine type communication (mMTC).

During early deployment of new radio (NR), obtaining complete NR coverage presented a significant technical challenge. Therefore, typical network coverage includes a wide-area long term evolution (LTE) coverage mode and an NR island coverage mode. Moreover, because a large proportion of LTE is deployed below 6 gigahertz (GHz), frequency spectrums below 6 GHz that may be used for 5G are rare. Therefore, in NR, application of frequency spectra above 6 GHz is needed, but high frequency bands have limited coverage and quick signal fading. To protect early investment of mobile operators in LTE, an operating mode of tight interworking between LTE and NR is proposed. Specifically, LTE-NR dual-connectivity (DC) is supported through a bandwidth combination in transmitting data, thereby increasing a system throughput. However, there is currently no definite signal quality measurement method for the foregoing operating mode of tight interworking between LTE and NR.

SUMMARY OF THE INVENTION

A measurement gap configuration method, a terminal device, and a network device are provided, to enable a terminal device to flexibly process a measurement and data receiving/transmission process, to reduce impact of measurement on data receiving/transmission, thereby improving user experience.

A first aspect provides a measurement gap configuration method, including: receiving, by a terminal device, configuration information sent by a network device, where the configuration information includes at least one measurement gap corresponding to a plurality of radio frequency channels that the terminal device has; and performing, by the terminal device, signal quality measurement according to the at least one measurement gap.

In this embodiment of the present invention, a method for configuring, by the network device, a measurement gap for the terminal device is proposed. A measurement gap of each radio frequency channel is defined, and configured for the terminal device, to enable the terminal device to flexibly process a measurement and data receiving/transmission process, to reduce impact of measurement on data receiving/transmission, thereby improving user experience.

In some possible implementations, before the receiving, by a terminal device, configuration information sent by a network device, the method further includes: sending, by the terminal device, radio frequency capability information of the terminal device to the network device, so that the network device generates the configuration information according to the radio frequency capability information, where the radio frequency capability information includes at least one of the following information: quantity of radio frequency channels supported by the terminal device, information about a frequency spectrum supported by each radio frequency channel, radio frequency channel capability information, and indication information used to indicate whether the terminal device supports performing signal quality measurement according to the measurement gap corresponding to the plurality of radio frequency channels.

In some possible implementations, the radio frequency channel capability information includes at least one of the following information: quantity of the plurality of radio frequency channels, a multiple-input multiple-output (MIMO) capability, quantity of data receiving channels, quantity of data transmitting channels, and a carrier aggregation supporting capability.

In some possible implementations, each of the plurality of radio frequency channels corresponds to one measurement gap.

In some possible implementations, a first measurement gap corresponding to a first radio frequency channel of the plurality of radio frequency channels is only used to perform measurement on the first radio frequency channel.

In some possible implementations, the plurality of radio frequency channels correspond to a same measurement gap.

A second aspect provides a measurement gap configuration method, including: generating, by a network device, configuration information, where the configuration information includes at least one measurement gap corresponding to a plurality of radio frequency channels that a terminal device has; and sending, by the network device, the configuration information to the terminal device.

In some possible implementations, before the generating, by a network device, configuration information, the method further includes: receiving, by the network device, radio frequency capability information of the terminal device sent by the terminal device, where the radio frequency capability information includes at least one of the following information: quantity of radio frequency channels supported by the terminal device, information about a frequency spectrum supported by each radio frequency channel, radio frequency channel capability information, and indication information used to indicate whether the terminal device supports performing signal quality measurement according to the measurement gap corresponding to the plurality of radio frequency channels, where the generating, by a network device, configuration information includes: generating, by the network device, the configuration information according to the radio frequency capability information.

In some possible implementations, the radio frequency channel capability information includes at least one of the following information: quantity of the plurality of radio frequency channels, a multiple-input multiple-output MIMO capability, quantity of data receiving channels, quantity of data transmitting channels, and a carrier aggregation supporting capability.

In some possible implementations, each of the plurality of radio frequency channels corresponds to one measurement gap.

In some possible implementations, a first measurement gap corresponding to a first radio frequency channel of the plurality of radio frequency channels is only used to perform measurement on the first radio frequency channel.

In some possible implementations, the plurality of radio frequency channels correspond to a same measurement gap.

A third aspect provides a terminal device, including: a transceiver unit, configured to receive configuration information sent by a network device, where the configuration information includes at least one measurement gap corresponding to a plurality of radio frequency channels that the terminal device has; and a measurement unit, configured to perform signal quality measurement according to the at least one measurement gap.

A fourth aspect provides a terminal device, including: a transceiver, configured to receive configuration information sent by a network device, where the configuration information includes at least one measurement gap corresponding to a plurality of radio frequency channels that the terminal device has; and a processor, configured to perform signal quality measurement according to the at least one measurement gap.

A fifth aspect provides a network device, including: a processing unit, configured to generate configuration information, where the configuration information includes at least one measurement gap corresponding to a plurality of radio frequency channels that a terminal device has; and a transceiver unit, configured to send the configuration information to the terminal device.

A sixth aspect provides a network device, including: a processor, configured to generate configuration information, where the configuration information includes at least one measurement gap corresponding to a plurality of radio frequency channels that a terminal device has; and a transceiver, configured to send the configuration information to the terminal device.

A seventh aspect provides a computer readable medium, configured to store a computer program, where the computer program includes an instruction used to perform the method embodiment of the first aspect, the second aspect, or the third aspect.

An eighth aspect provides a computer chip, including: an input interface, an output interface, at least one processor, and memory. The processor is configured to execute code in the memory, and when the code is executed, the processor may implement each process, performed by a terminal device, in the measurement gap configuration method in the first aspect and various implementations.

A ninth aspect provides a computer chip, including: an input interface, an output interface, at least one processor, and memory. The processor is configured to execute code in the memory, and when the code is executed, the processor may implement each process, performed by a network device, in the measurement gap configuration method in the second aspect and various implementations.

A tenth aspect provides a communications system, including the foregoing network device and the foregoing terminal device.

DETAILED DESCRIPTION OF THE INVENTION

Figure 1:
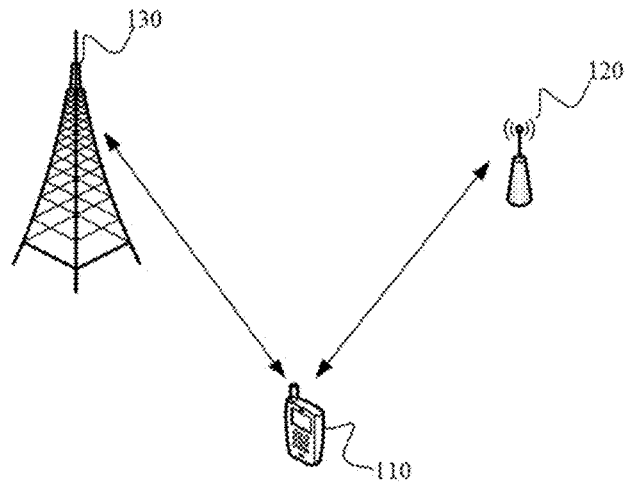
FIG. 1 shows an example of an application scenario of the present invention.

FIG. 1 is a schematic diagram of an application scenario according to an embodiment of the present invention.

As shown in FIG. 1, a terminal device 110 is connected to a first network device 130 served by a first communications system and a second network device 120 served by a second communications system. For example, the first network device 130 is a network device in long term evolution (LTE), and the second network device 120 is a network device in new radio (NR).

The first network device 130 and the second network device 120 may include a plurality of cells. However, before the terminal device 110 performs cell handover, the terminal device 110 normally measures power (signal quality) of a target cell and reports the power to the first network device 130, and the first network device 130 determines whether to allow the terminal device 110 to be handed over to the target cell.

It may be found that, if the target cell and a current cell have a same frequency (intra-frequency measurement), the terminal device 110 can measure the signal quality of the target cell relatively easily; but if the target cell and the current cell have different frequencies (inter-frequency measurement), the terminal device 110 has difficulty in attempting to measure the signal quality of the target cell.

The simplest inter-frequency measurement solution is to implement two radio frequency (RF) transceivers on UE. However, the dual RF transceiver solution has actual difficulties, where one problem is costs, and additional costs are required to implement an additional transceiver; and another problem is possible interference that exists between a current frequency and a target frequency particularly when the two frequencies are close, and particularly in a dual-connectivity scenario.

To resolve the foregoing problems, in the embodiments of the present invention, a method for configuring, by a network device, a measurement gap for a terminal device is proposed. In a dual-connectivity scenario, a measurement gap of each radio frequency channel is defined, and configured for the terminal device, to enable the terminal device to flexibly process a measurement and data receiving/transmission process, to reduce impact of measurement on data receiving/transmission, thereby improving user experience.

It should be understood that, FIG. 1 shows an example of a scenario according to an embodiment of the present invention, but this embodiment of the present invention is not limited to what is shown in FIG. 1.

For example, a communications system to which this embodiment of the present invention adapts may include at least a plurality of network devices served by the first communications system and/or a plurality of network devices served by the second communications system.

For another example, the first communications system and the second communications system in this embodiment of the present invention are different, but specific types of the first communications system and the second communications system are not limited. For example, the first communications system and the second communications system may be various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE time division duplex (TDD) system, and a universal mobile telecommunications system (UMTS) system.

Moreover, in the present invention, the embodiments are described with reference to the network devices (the first network device to a fourth network device) and the terminal device.

The network device may be any entity configured to send or receive a signal on a network side. For example, the network device may be machine type communication (MTC) user equipment, a base transceiver station (BTS) in GSM or CDMA, a NodeB in WCDMA, an evolved NodeB (eNB or eNodeB) in LTE, or a base station device in a 5G network.

The terminal device 110 may be any terminal device. Specifically, the terminal device may communicate with one or more core networks through a radio access network (RAN), and may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. For example, the terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a 5G network.

Figure 2:
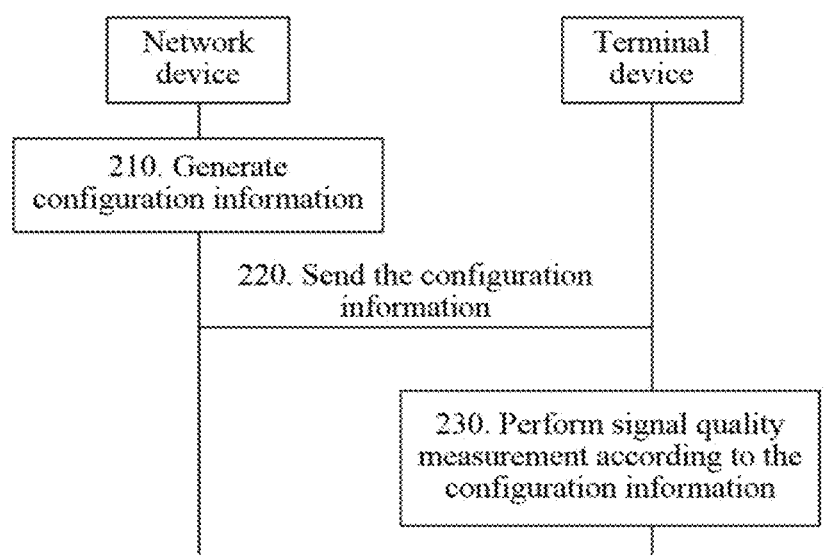
FIG. 2 is a schematic block diagram of a measurement gap configuration method according to an embodiment of the present invention.

FIG. 2 is a schematic flowchart of a measurement gap configuration method according to an embodiment of the present invention.

As shown in FIG. 2, the method includes the following steps.

210. A network device generates configuration information.

220. The network device sends the configuration information to a terminal device.

230. The terminal device performs signal quality measurement according to the configuration information.

Specifically, the terminal device receives the configuration information sent by the network device, where the configuration information includes at least one measurement gap corresponding to a plurality of radio frequency channels that the terminal device has; and then performs signal quality measurement according to the at least one measurement gap.

It should be understood that, the measurement gap configured for the terminal device may be used to perform inter-frequency measurement or intra-frequency measurement. In other words, the measurement gap configured for the terminal device (a current cell) is not used to send data and is not used to receive data either. Therefore, the terminal device may be handed over to a target cell and perform signal quality measurement, and then be handed over back to the current cell (continues a normal receiving/transmission operation).

To enable the terminal device to operate in a seamless manner, measurement gaps need to be kept synchronous between the terminal device and the network device (for example, a start location of the measurement gap, a length of the measurement gap, and quantity of the measurement gaps).

The terminal device is in a dual-connectivity operating mode. Therefore, in this embodiment of the present invention, a measurement gap based on radio frequency channels is defined, that is, a measurement gap is configured for radio frequency channels. It should be understood that, this measurement gap affects only data receiving/transmission of a data receive (Rx) channel/data transmit (Tx) channel of the current radio frequency channels; but does not affect data receiving/transmission of other radio frequency channels.

A plurality of radio frequency channels of this embodiment of the present invention may be divided based on a frequency range, or may be divided based on a type of a communications system. This is not specifically limited in this embodiment of the present invention.

Moreover, the terminal device may support a plurality of radio frequency channels (particularly in a dual-connectivity scenario), and bands on which the radio frequency channels can perform measurement or bands supported by the radio frequency channels are different, which depends on capabilities of the radio frequency channels (supported by a power amplifier PA and an antenna).

For example, assuming that the terminal device (for example, a mobile phone) is designed based on a band during radio frequency design, after accessing a network, the terminal device needs to report information about a band that can be supported by the terminal device, and information about a band combination supported by carrier aggregation (CA), information about a band combination supported in a dual-connectivity (DC) scenario, and a measurement related capability.

Therefore, in an embodiment, before the terminal device receives the configuration information sent by the network device, the terminal device may send radio frequency capability information of the terminal device to the network device, so that the network device generates the configuration information according to the radio frequency capability information.

The radio frequency capability information includes at least one of the following information: quantity of radio frequency channels supported by the terminal device, information about a frequency spectrum supported by each radio frequency channel, radio frequency channel capability information, and indication information used to indicate whether the terminal device supports performing signal quality measurement according to the measurement gap corresponding to the plurality of radio frequency channels.

In other words, before the network device generates the configuration information, the terminal device needs to report the radio frequency capability information of the terminal device, so that the network device generates the configuration information according to the radio frequency capability information of the terminal device.

Further, the radio frequency channel capability information includes at least one of the following information: quantity of the plurality of radio frequency channels, a multiple-input multiple-output MIMO capability, quantity of data receiving channels, quantity of data transmitting channels, and a carrier aggregation supporting capability.

It should be understood that, the plurality of radio frequency channels in this embodiment of the present invention corresponds to at least one measurement gap. For example, each of the plurality of radio frequency channels may correspond to one measurement gap. Specifically, a first measurement gap corresponding to a first radio frequency channel of the plurality of radio frequency channels is only used to perform measurement on the first radio frequency channel.

For example, it is assumed that the terminal device has two radio frequency channels: RF-CH1 and RF-CH2. The network device may respectively configure individual gap1 and gap2 for the two radio frequency channels. The gap1 is used for the radio frequency channel RF-CH1, and the gap2 is used for the radio frequency channel RF-CH2. When measurement that the terminal device needs to perform is located on only the radio frequency channel RF-CH1, the gap1 is used. When the terminal device performs measurement on the gap1, downlink receiving or the like of the terminal device on the radio frequency channel RF-CH2 is not affected.

For another example, the plurality of radio frequency channels correspond to a same measurement gap.

In other words, the network device configures gap3 for the terminal device, and the gap3 is used for cross-radio frequency channel RF-CH1/radio frequency channel RF-CH2 measurement.

Figure 3:
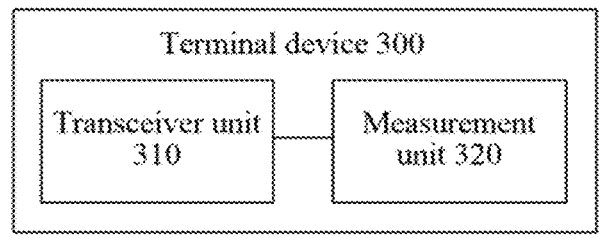
FIG. 3 is a schematic block diagram of a terminal device according to an embodiment of the present invention.

FIG. 3 is a schematic block diagram of a terminal device according to an embodiment of the present invention. As shown in FIG. 3, the terminal device 300 includes: a transceiver unit 310, configured to receive configuration information sent by a network device, where the configuration information includes at least one measurement gap corresponding to a plurality of radio frequency channels that the terminal device has; and a measurement unit 320, configured to perform signal quality measurement according to the at least one measurement gap.

Optionally, the transceiver unit 310 is further configured to: send, before receiving the configuration information sent by the network device, radio frequency capability information of the terminal device to the network device, so that the network device generates the configuration information according to the radio frequency capability information.

The radio frequency capability information includes at least one of the following information: quantity of radio frequency channels supported by the terminal device, information about a frequency spectrum supported by each radio frequency channel, radio frequency channel capability information, and indication information used to indicate whether the terminal device supports performing signal quality measurement according to the measurement gap corresponding to the plurality of radio frequency channels.

Optionally, the radio frequency channel capability information includes at least one of the following information: quantity of the plurality of radio frequency channels, a multiple-input multiple-output MIMO capability, quantity of data receiving channels, quantity of data transmitting channels, and a carrier aggregation supporting capability.

Optionally, each of the plurality of radio frequency channels corresponds to one measurement gap.

Optionally, a first measurement gap corresponding to a first radio frequency channel of the plurality of radio frequency channels is only used to perform measurement on the first radio frequency channel.

Optionally, the plurality of radio frequency channels correspond to a same measurement gap.

Figure 4:
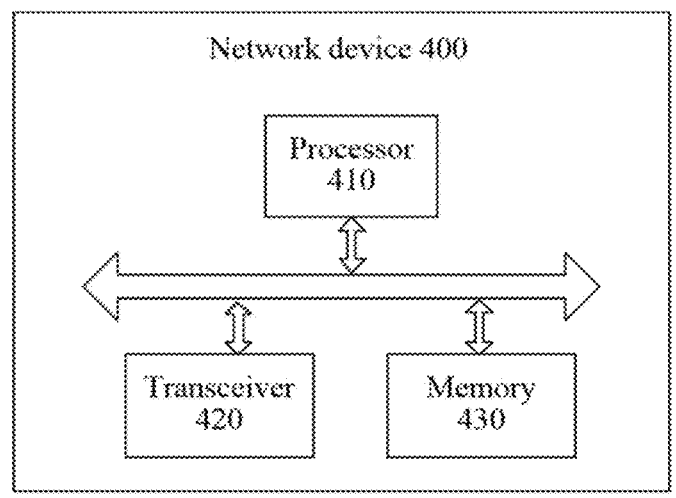
FIG. 4 is a schematic block diagram of another terminal device according to an embodiment of the present invention.

It should be noted that, the transceiver unit 310 may be implemented by a transceiver, and the measurement unit 320 may be implemented by a processor. As shown in FIG. 4, a terminal device 400 may include a processor 410, a transceiver 420, and a memory 430. The memory 430 may be configured to store indication information, and may be further configured to store code, an instruction, or the like executed by the processor 410. Components in the terminal device 400 are connected to each other through a bus system, where in addition to a data bus, the bus system further includes a power bus, a control bus, and a status signal bus.

The terminal device 400 shown in FIG. 4 can implement each process implemented by the terminal device in the method embodiment in FIG. 2. To avoid repetition, details are not described herein again.

Figure 5:
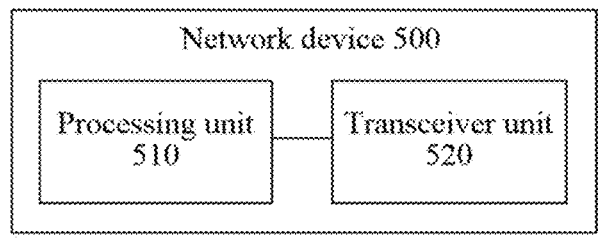
FIG. 5 is a schematic block diagram of a network device according to an embodiment of the present invention.

FIG. 5 is a schematic block diagram of a network device according to an embodiment of the present invention.

A processing unit 510 is configured to generate configuration information, where the configuration information includes at least one measurement gap corresponding to a plurality of radio frequency channels that a terminal device has; and a transceiver unit 520 is configured to send the configuration information to the terminal device.

Optionally, the transceiver unit 510 is further configured to: receive, before generating the configuration information, radio frequency capability information of the terminal device sent by the terminal device, where the processing unit 510 is specifically configured to generate the configuration information according to the radio frequency capability information.

The radio frequency capability information includes at least one of the following information: quantity of radio frequency channels supported by the terminal device, information about a frequency spectrum supported by each radio frequency channel, radio frequency channel capability information, and indication information used to indicate whether the terminal device supports performing signal quality measurement according to the measurement gap corresponding to the plurality of radio frequency channels.

Optionally, the radio frequency channel capability information includes at least one of the following information: quantity of the plurality of radio frequency channels, a multiple-input multiple-output MIMO capability, quantity of data receiving channels, quantity of data transmitting channels, and a carrier aggregation supporting capability.

Optionally, each of the plurality of radio frequency channels corresponds to one measurement gap.

Optionally, a first measurement gap corresponding to a first radio frequency channel of the plurality of radio frequency channels is only used to perform measurement on the first radio frequency channel.

Optionally, the plurality of radio frequency channels correspond to a same measurement gap.

Figure 6:
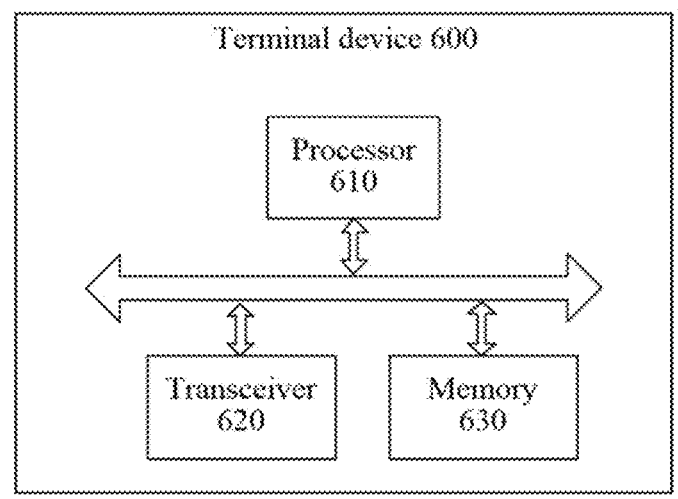
FIG. 6 is a schematic block diagram of another network device according to an embodiment of the present invention.

It should be noted that, the processing unit 510 may be implemented by a processor, and the transceiver unit 520 may be implemented by a transceiver. As shown in FIG. 6, a network device 600 may include a processor 610, a transceiver 620, and a memory 630. The memory 630 may be configured to store indication information, and may be further configured to store code, an instruction, or the like executed by the processor 610. Components in the network device 600 are connected to each other through a bus system, where in addition to a data bus, the bus system further includes a power bus, a control bus, and a status signal bus.

The network device 600 shown in FIG. 6 can implement each process, implemented by the network device, in the method embodiment in FIG. 2. To avoid repetition, details are not described herein again.

It should be understood that, the method embodiment of the embodiments of the present invention may be applied to the processor or implemented by the processor.

During implementation, the steps of the method embodiment of the embodiments of the present invention may be implemented by using a hardware integrated logic circuit in the processor or implemented by using an instruction in a software form. More specifically, steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

The processor may be an integrated circuit chip having a signal processing capability, and may implement or perform methods, steps, and logical block diagrams disclosed in the embodiments of the present invention. For example, the foregoing processor may be a general purpose processor, a digital signal processor (DSP), an application-specific integrated circuit (ASIC), a field programmable gate array (FPGA), or another programmable logical device, or transistor logical device, or discrete hardware component. Moreover, the general purpose processor may be a microprocessor or the processor may be any conventional processor and the like.

Moreover, the memory in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. It should be understood that, the foregoing memory is described as an example rather than a limitation. For example, the memory in this embodiment of the present invention may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is to say, the memory for the system and the method described herein aims to include but not limited to these memories and any other suitable types of memories.

Finally, it should be noted that, the terms used in the embodiments and the appended claims of the present invention are merely for describing specific embodiments, but are not intended to limit the embodiments of the present invention.

For example, the terms "a", "said" and "the" of singular forms used in the embodiments and the appended claims of the present invention are also intended to include plural forms, unless otherwise specified in the context clearly.

For another example, depending on the context, the word "when" as used herein may be explained as "if" or "on condition that" or "while" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the embodiments of the present invention.

In addition, functional units in the embodiments of the present invention may be integrated into one processing unit, or each of the units may exist alone physically, or two or more units are integrated into one unit.

When the functional units are implemented in a form of a software functional module and sold or used as an independent product, the functional units may be stored in a computer-readable storage medium. Based on such an understanding, the technical solutions of the embodiments of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiments of the present invention. The foregoing storage medium includes: any medium that can store program codes, such as a USB flash disk, a removable hard disk, a read-only memory, a random access memory, a magnetic disk, or an optical disk.

The foregoing contents are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A measurement gap configuration method for a dual-connectivity operating mode, comprising:
   sending, by a terminal device operating in the dual-connectivity operating mode including a first radio frequency channel in long term evolution (LTE) and a second radio frequency channel in new radio (NR), radio frequency capability information of the terminal device to a network device, wherein the radio frequency capability information is indication information used to indicate whether the terminal device supports performing signal quality measurement according to a measurement gap corresponding to the first radio frequency channel in LTE and the second radio frequency channel in NR;
   receiving, by the terminal device, configuration information sent by the network device, wherein when the radio frequency capability information indicates that the terminal device supports performing signal quality measurement according to the measurement gap corresponding to the first radio frequency channel in LTE and the second radio frequency channel in NR, the configuration information comprises a same measurement gap corresponding to the first radio frequency channel in LTE and the second radio frequency channel in NR associated with the terminal device; and
   performing, by the terminal device, signal quality measurement on the first radio frequency channel in LTE and the second radio frequency channel in NR according to the same measurement gap.

2. A terminal device having a dual-connectivity operating mode and operating in the dual-connectivity operating mode including a first radio frequency channel in long term evolution (LTE) and a second radio frequency channel in new radio (NR), comprising:
   a transceiver unit, configured to send radio frequency capability information of the terminal device to a network device, wherein the radio frequency capability information is indication information used to indicate whether the terminal device supports performing signal quality measurement according to a measurement gap corresponding to the first radio frequency channel in LTE and the second radio frequency channel in NR; and receive configuration information sent by the network device, wherein when the radio frequency capability information indicates that the terminal device supports performing signal quality measurement according to the measurement gap corresponding to the first radio frequency channel in LTE and the second radio frequency channel in NR, the configuration information comprises a same measurement gap corresponding to the first radio frequency channel in LTE and the second radio frequency channel in NR; and
   a measurement unit, configured to perform signal quality measurement on the first radio frequency channel in LTE and the second radio frequency channel in NR according to the same measurement gap.

3. A network device having a dual-connectivity operating mode and operating in the dual-connectivity operating mode including a first radio frequency channel in long term evolution (LTE) and a second radio frequency channel in new radio (NR), comprising:
   a transceiver unit configured to receive radio frequency capability information of a terminal device sent by the terminal device, wherein the radio frequency capability information is indication information used to indicate whether the terminal device supports performing signal quality measurement according to a measurement gap corresponding to the first radio frequency channel in LTE and the second radio frequency channel in NR; and
   a processing unit configured to generate configuration information, wherein when the radio frequency capability information indicates that the terminal device supports performing signal quality measurement according to the measurement gap corresponding to the first radio frequency channel in LTE and the second radio frequency channel in NR, the configuration information comprises a same measurement gap corresponding to the first radio frequency channel in LTE and the second radio frequency channel in NR,
   wherein the transceiver unit is further configured to send the configuration information to the terminal device.

* * * * *